(12) United States Patent
Hwang

(10) Patent No.: US 7,076,422 B2
(45) Date of Patent: Jul. 11, 2006

(54) MODELLING AND PROCESSING FILLED PAUSES AND NOISES IN SPEECH RECOGNITION

(75) Inventor: Mei-Yuh Hwang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 10/388,259

(22) Filed: Mar. 13, 2003

(65) Prior Publication Data

US 2004/0181410 A1   Sep. 16, 2004

(51) Int. Cl.
*G10L 15/20* (2006.01)
(52) U.S. Cl. .................. 704/226; 704/256
(58) Field of Classification Search ............... 704/226, 704/256, 256.4, 252
See application file for complete search history.

(56) References Cited

U.S. PATENT DOCUMENTS

| | | | | |
|---|---|---|---|---|
| 4,852,180 | A * | 7/1989 | Levinson | 704/256.4 |
| 5,778,341 | A * | 7/1998 | Zeljkovic | 704/256 |
| 6,092,042 | A * | 7/2000 | Iso | 704/240 |
| 6,356,865 | B1 * | 3/2002 | Franz et al. | 704/2 |
| 6,374,224 | B1 * | 4/2002 | Horiguchi et al. | 704/266 |
| 6,442,524 | B1 * | 8/2002 | Ecker et al. | 704/277 |
| 6,662,158 | B1 * | 12/2003 | Hon et al. | 704/252 |

OTHER PUBLICATIONS

"*Improvements in Spontaneous Speech Recognition*" by Daben Liu, etc. at Broadcast News Transcription and Understanding Workshop, Feb. 8-11, 1998, sponsored by DARPA.
Application filed for Word-Specific Acoustic Models in a Speech Recognition System, U.S. Appl. No. 10/364,084, filed Feb. 11, 2003.
Z. Liu, J. Huang, and Y. Wang, "Classification of TV programs based on audio information using hidden Markov model," in IEEE Workshop Multimedia Signal Processing (MMSP-98), Los Angeles, CA, Dec. 7-9, 1998, pp. 27-32. Http://citeser.ist.psu.edu/article/liu98classification.html.
S. E. Levinson, et al., "Speaker Independent Isolated Digit Recognition Using Hidden Markov Models", pp. 1049-1052, ICASSP 83, Boston, 1983 IEEE.

* cited by examiner

*Primary Examiner*—Susan McFadden
(74) *Attorney, Agent, or Firm*—Steven M. Koehler; Westman,Champlin & Kelly, P.A.

(57) ABSTRACT

A speech recognition system recognizes filled pause utterances made by a speaker. In one embodiment, an ergodic model is used to acoustically model filled pauses that provides flexibility allowing varying utterances of the filled pauses to be made. The ergodic HMM model can also be used for other types of noise such as but limited to breathing, keyboard operation, microphone noise, laughter, door openings and/or closings, or any other noise occurring in the environment of the user or made by the user. Similarly, silence can be modeled using an ergodic HMM model. Recognition can be used with N-gram, context-free grammar or hybrid language models.

22 Claims, 6 Drawing Sheets

MODELLING AND PROCESSING FILLED PAUSES AND NOISES IN SPEECH RECOGNITION

BACKGROUND OF THE INVENTION

The present invention relates to speech recognition. More specifically, the present invention relates to filled pauses, restarts, and other noise events in continuous speech recognition.

A speech recognition system receives a speech signal and attempts to decode the speech signal to identify a string of words represented by the speech signal. Conventional speech recognizers include, among other things, an acoustic model and a language model usually from training data. The acoustic model models the acoustic features of speech units (such as phonemes) based on the training data. The language model models word order as found in the training data.

When the speech signal is received for speech recognition, acoustic features are extracted from the speech signal and compared against the models in the acoustic model to identify speech units contained in the speech signal. Once words are identified, the words are compared against the language model to determine the probability that a word was spoken, given its history (or context).

Events occurring in speech, and in particular, recognition of spontaneous or continuous speech, can present considerable problems for speech recognizers. One particular problem includes processing filled pauses such as "um", "hmm", "er", "uh", etc., the type of which may vary from language to language, or to culture to culture, but nevertheless is an utterance commonly made when a person is composing or contemplating speech to be made. Problems occur when a speech recognizer misrecognizes the filled pause as a valid word due to the high signal-to-noise ratio for the utterance of the filled pause. Other environmental situations contributing to noise such as breathing, microphone noise, keyboard operation, opening and closing of doors, as well as re-starts or false starts made by the speaker in words also contribute to errors during speech recognition.

A method or system that addresses one, some or all of the foregoing problems would be beneficial and provide improved speech recognition.

SUMMARY OF THE INVENTION

The present invention provides improved speech recognition by recognizing filled pause utterances made by a speaker. In one embodiment, an ergodic model is used to acoustically model filled pauses that provides flexibility allowing varying utterances of the filled pauses to be made. Filled pause recognition can be used with N-gram, context-free grammar or hybrid language models.

When used with context-free grammar models, automatic insertion of filled pause recognition can be provided. In a further embodiment transition probabilities can be automatically calculated based on the structure of the corresponding CFG rule.

By recognizing filled pauses, the speech recognizer can then omit any corresponding text from the output. More importantly, recognition of filled pauses reduces errors where the filled pauses would otherwise be misrecongized as other words. In addition to recognizing filled pauses, recognition errors are reduced for words surrounding the filled pauses.

DETAILED DESCRIPTION OF ILLUSTRATIVE EMBODIMENTS

One aspect of the present invention relates to processing of filled pauses in speech recognition. However, prior to discussing this and other aspects in detail, a description of one exemplary environment in which the present invention can be used will be provided.

Figure 1:
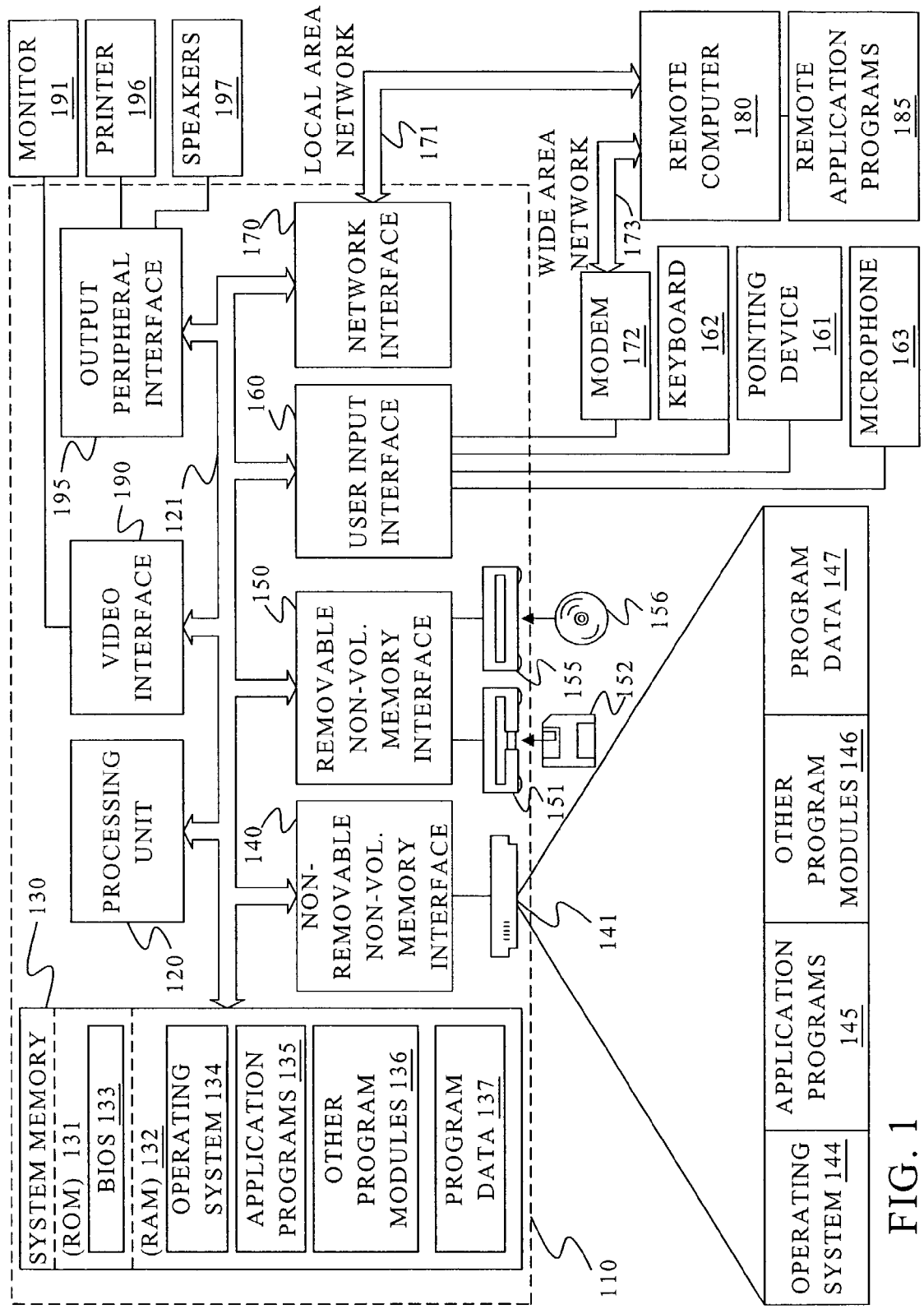
FIG. 1 is one exemplary embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
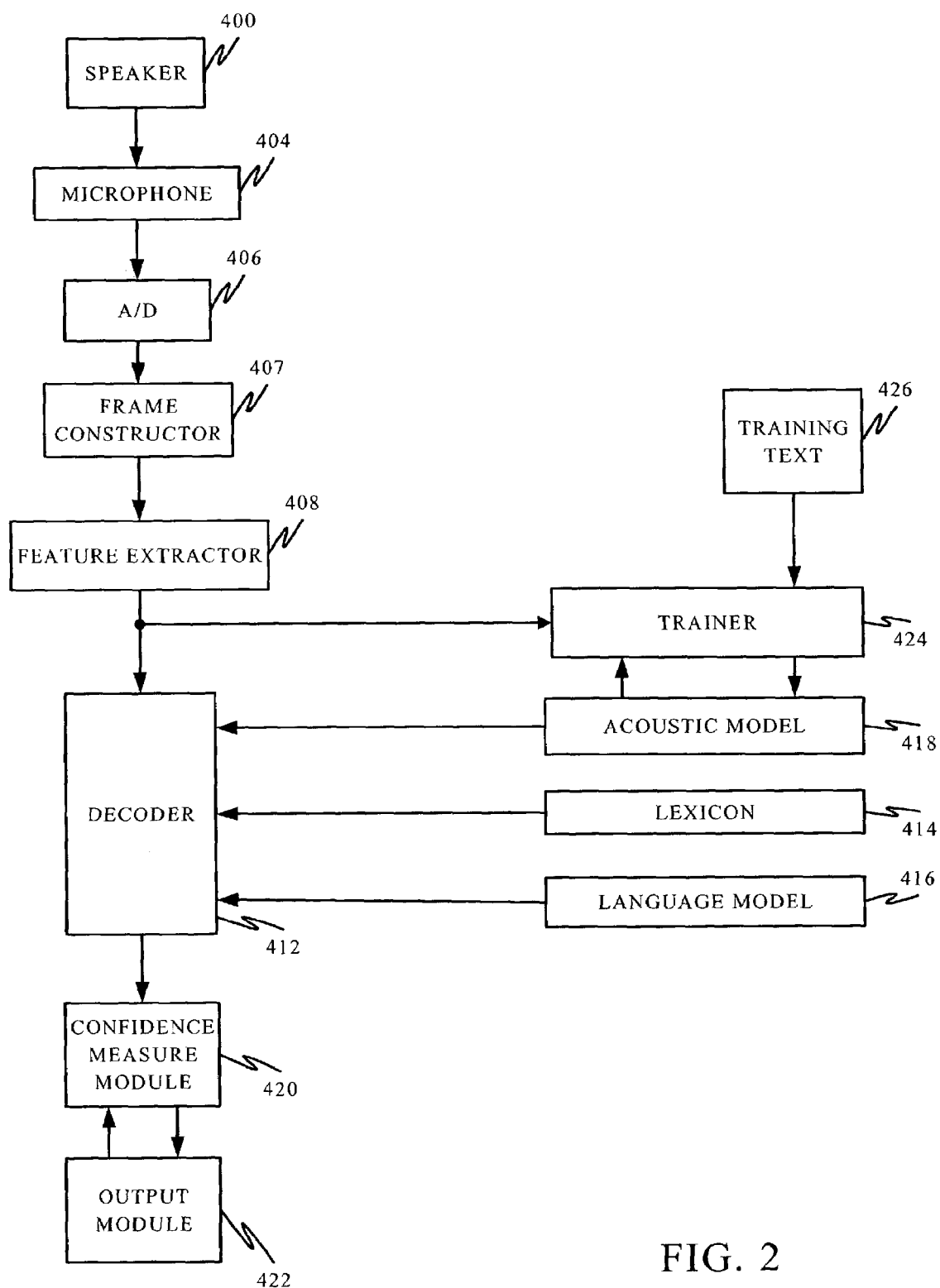
FIG. 2 is a block diagram of a speech recognition system in accordance with one embodiment of the present invention.

FIG. 2 provides a block diagram of an environment in which an acoustic model of the present invention may be utilized to perform speech recognition. In FIG. 2, a speaker 400 speaks into a microphone 404. The audio signals detected by microphone 404 are converted into electrical signals that are provided to analog-to-digital (A-to-D) converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second. These digital values are provided to a frame constructor 407, which, in one embodiment, groups the values into 25 millisecond frames that start 10 milliseconds apart.

The frames of data created by frame constructor 407 are provided to feature extractor 408, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module 408 produces a stream of feature vectors that are each associated with a frame of the speech signal. This stream of feature vectors is provided to a decoder 412, which identifies a most likely sequence of words based on the stream of feature vectors, a lexicon 414, a language model 416 (for example, based on an N-gram, context-free grammars, or hybrids thereof), and the acoustic model 418. The particular method used for decoding is not important to the present invention. However, aspects of the present invention include modifications to the language model 416 and the use thereof.

The most probable sequence of hypothesis words can be provided to an optional confidence measure module 420. Confidence measure module 420 identifies which words are most likely to have been improperly identified by the speech recognizer. This can be based in part on a secondary acoustic model or other knowledge sources such as a high-level natural language parser (not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

During training, a speech signal corresponding to training text 426 is input to decoder 412, along with a lexical transcription of the training text 426. Trainer 424 trains acoustic model 418 based on the training inputs. The speech signal includes filled pause utterances and can further include silence and other types of noise as discussed below. In addition, the speech signal can include false starts or re-starts where the speaker does not complete a word due to a mistake in reading, pronunciation or other mishap. The lexical transcription of the speech input includes labeling or other indicators to identify corresponding portions of the speech input for each of these events. Labeling of re-starts and partial words in the acoustic training data provides better alignment during the training, and therefore, yields more accurate acoustic models.

Acoustic model 418 includes Hidden Markov Model (HMM) chains that acoustically represent typically sub-word speech units. For purposes of this discussion, all sub-word speech units will be referred to as phones. Phones will include phonemes, context dependent phones and other sub-word speech units, while a "word" is intended to have a broad meaning representing a speech sound or a series of speech sounds in any language.

As indicated in the Background Section, filled pauses can contribute to recognition errors, in particular, during spontaneous or continuous speech recognition. One aspect of the present invention includes modifying the lexicon 414, language model 416 and/or the acoustic model 418 in order to process the pauses in the speech input and provide only text output or other outputs without filled pauses contained therein.

Figure 3:
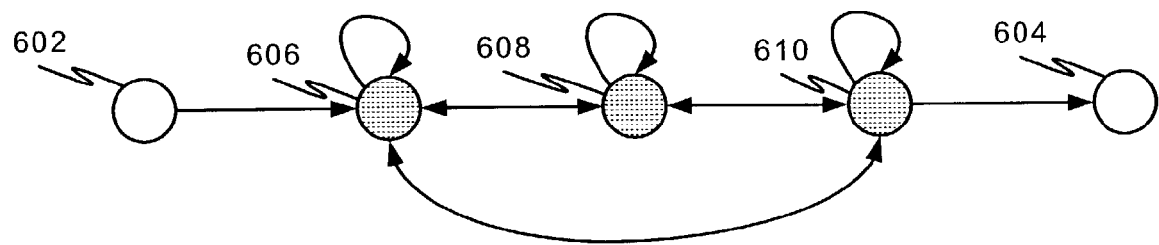
FIG. 3 is a block diagram illustrating an acoustic model topology in accordance with one embodiment of the present invention.

In one embodiment, filled pause acoustic models have an ergodic HMM topology as illustrated in FIG. 3. As illustrated, the HMM model topology includes a start node 602, and end node 604 and three emitting states 606, 608 and 610. In the example illustrated, three emitting states 606, 608 and 610 are illustrated. However, as appreciated by those skilled in the art any number of the emitting states can be used.

The arrows in the model topology of FIG. 3 represent probabilities of remaining in a given state (the self-loop probability), or transitioning to a next state (the transition probability). In a conventional HMM model, a single transition to only a higher state (for example, from state 606 to 608) is allowed, but in the ergodic HMM model transitions can be made from any state to any other state. In the illustration of FIG. 3, this is represented by double-ended arrows. The flexibility of the ergodic HMM topology where transitions can be made back to earlier states, or where states can be skipped, allows the model to accommodate filled pauses having different durations. It should be noted that this aspect of the invention, modeling of filled pauses with an ergodic model, is not limited to use with only a fully ergodic model. In other words, other ergodic model topologies for filled pauses may allow only some states to have multiple transition paths to earlier and/or succeeding states. It should be also mentioned at this point that further aspects of the present invention can be practiced with ergodic as well as conventional, non-ergodic, HMM models for filled pauses, which only allow transitions to higher, successive states.

With the acoustic model 418 modified to include filled pauses, the lexicon 414 is also modified to include filled pause entries transcribed by phones.

The ergodic HMM model of FIG. 3 can also be used for other types of noise such as but not limited to breathing, keyboard operation, microphone noise, laughter, door openings and/or closings, or any other noise occurring in the environment of the user or made by the user. Depending upon the amount of training data available, a single universal noise model can be formed for all forms of user and/or environment noise. In situations where there exist enough samples of distinct noises in the training data, a noise model can be trained for each of the distinct noises.

Similarly, silence can be modeled using an ergodic HMM model like noise described above. During speech recognition, the speech recognizer allows silence to appear anywhere between two words. In one embodiment of the present invention, noise as described above is treated as an alternative pronunciation of silence and is also allowed to appear anywhere between two words, just like silence.

Filled pause recognition can be used with many types of language models. Take a statistically based language model such as an N-gram language model for example. Based on the particular application to which the speech recognizer will be used, if there exist sufficient occurrences of filled pauses in context in the training text, the language model can be prepared in a conventional manner. However, in many situations, due to the lack of training data some sort of backoff mechanism may need to be employed in the language model.

In one embodiment, unigrams of filled pauses in statistical language models are tuned by separate test set, based on a tradeoff between filled pause recognition rate and false alarm rate. In particular, the unigram backoff weights of filled pauses are set to one, and no further context values (e.g. bigram, trigram, etc.) of the filled pauses are included in the language model. In this manner, any transition to the filled pauses will be backed off to the filled pause unigram probability, which can be represented as:

$Pr([uh]|w_1\ w_2) = bbo(w_1\ w_2)$ unigram$([uh])$, if bigram $(w_2|w_1)$ exists $Pr([uh]|w_1\ w_2) = 1*$unigram $([uh])$, if bigram$(w_2|w_1)$ does not exist.

and, $Pr(w_3\ |[uh]\ w_2) = 1*$unigram $(w_3)$ $Pr(w_3\ |w_1\ [uh]) = 1*$unigram$(w_3)$ where,

[uh] is an exemplary filled pause; $w_1$, $w_2$, $w_3$ are contextual words; and bbo equals the bigram backoff weight.

It should be noted that if there exists sufficient training data with filled pauses, in another embodiment, the language model can be retrained with the possibility of smoothing the language model with a baseline language model so that the recognition rate of filled pauses versus the false alarm rate of filled pauses can be tuned.

Language models using context-free grammars can also be adapted to include filled pause recognition. In one embodiment of the present invention, possible recognition of filled pauses occurs in relation to the structure of a context-free grammar, and in particular, at the beginning of a top-level CFG rule, or at the beginning of each CFG rule. Stated another way, in one embodiment of the invention, processing the input speech to look for the possible utterance of a filled pause does not occur between each and every two successive words lest it incur high cost of search time, but rather at positions related to the structure of the defined context-free grammar rules. Since the CFG rules define possible or candidate words or phrases that a speaker may say, it is at these points, where choices are made by the speaker, that a filled pause may be spoken. It is believed that controlling the speech recognizer to recognize filled pauses at these locations in the input speech with respect to the language model (CFG), makes more efficient use of the computing resources to perform recognition.

An example may be helpful. Suppose input speech of a speaker is related to providing digits such as digits of a phone number. The language model may include a context-free grammar such as the one provided below and illustrated in FIG. 4.

```
<GRAMMAR LANGID="409">
    <RULE NAME="Digit" TOPLEVEL="ACTIVE">
        <L>
            <P WEIGHT="0.15"> zero </P>
            <P WEIGHT="0.0785"> one </P>
            <P WEIGHT="0.0785"> two </P>
            <P WEIGHT="0.0785"> three </P>
            <P WEIGHT="0.0785"> four </P>
```

-continued

```
            <P WEIGHT="0.0785"> five </P>
            <P WEIGHT="0.15"> six </P>
            <P WEIGHT="0.15"> seven </P>
            <P WEIGHT="0.0785"> eight </P>
            <P WEIGHT="0.0785"> nine </P>
        </L>
    </RULE>
</GRAMMAR>
```

Figure 4:
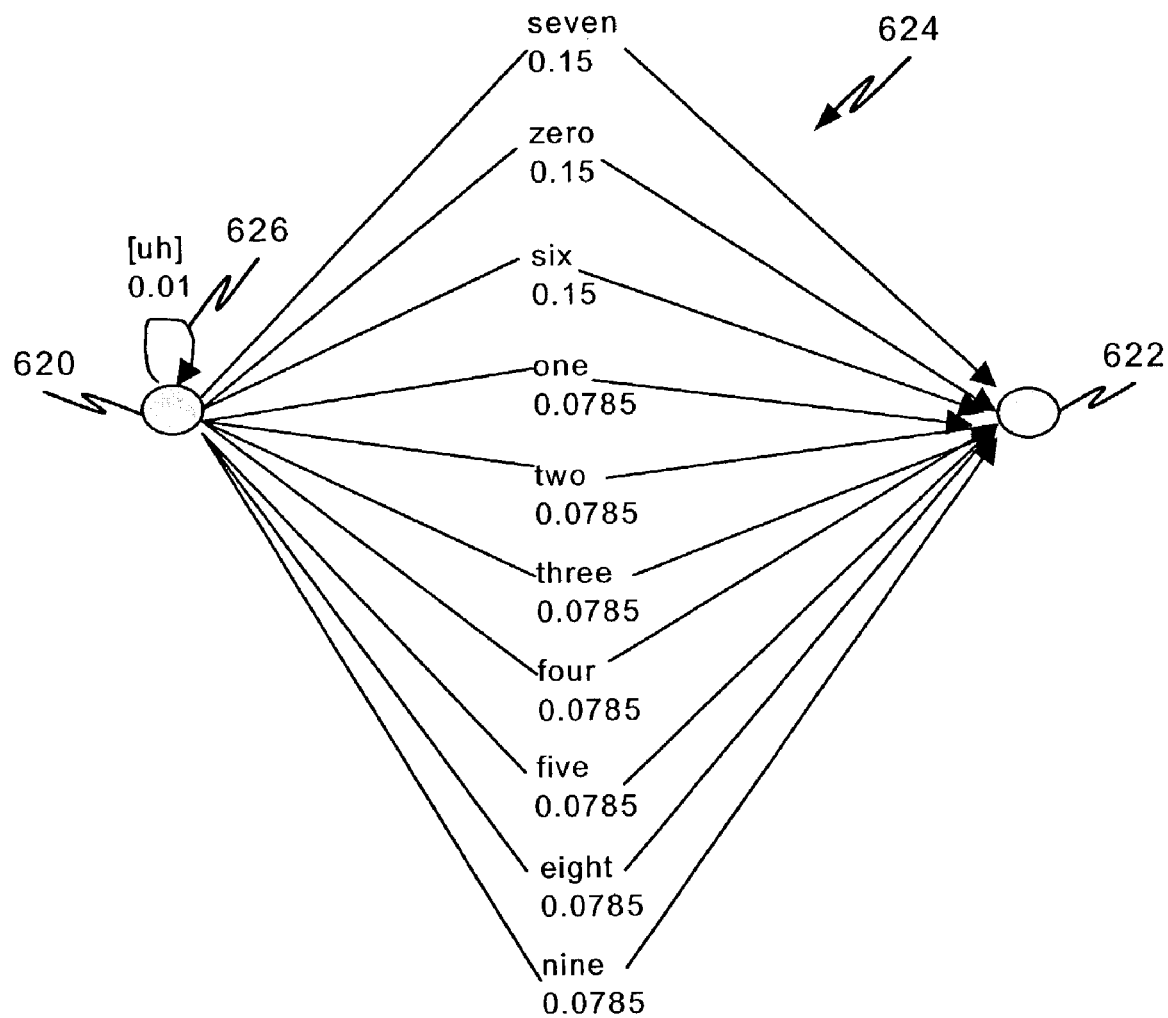
FIG. 4 is a block diagram illustrating location of filled pauses in context-free grammars.

Graphically, as illustrated in FIG. 4, the context-free grammar includes a start node 620, an end node 622 and a plurality of allowable entries 624, herein digits "0" to "9", forming alternative paths from the start node 620 to the end node 622. Start node 620 represents an allowable position where filled pause recognition can optionally and repetitively occur. For example, a speaker may utter a filled pause, while contemplating one or more digits of an area code in a telephone number.

In a further embodiment, a transition probability (indicated by self-loop arrow 626) is provided for the occurrence of a filled pause in the context-free grammar. In one embodiment, the filled pause transition probability is proportional to a number of possible paths (fan-out) of the context-free grammar from the start node 620. In this manner, as the number of possible paths of the context-free grammar increases in complexity, due to the modeled options for a speaker uttering the corresponding context, the speaker will more likely hesitate and utter a filled pause, while contemplating the next word or phrase. The transition probability to the filled pause, being proportional to the fan-out number, indicates the perplexity of a given node in the context-free grammar language model. It is believed that the perplexity of the node is a good indicator that the user will utter a filled pause when providing a speech indicative of the corresponding CFG rule. In this example, the transition probability for the filled pause is 0.01, which corresponds to 0.001×10 (number of fan-outs). Other functions for calculating the transition probability can be used.

In the exemplary CFG provided above and illustrated in FIG. 4, each of the lexical entries for the paths includes an associated probability, such as for the utterance of "0", the probability is "0.15". Nevertheless, it should be noted that the CFG rules need not have associated probabilities for the paths in order to implement this aspect of the present invention.

Figure 5:
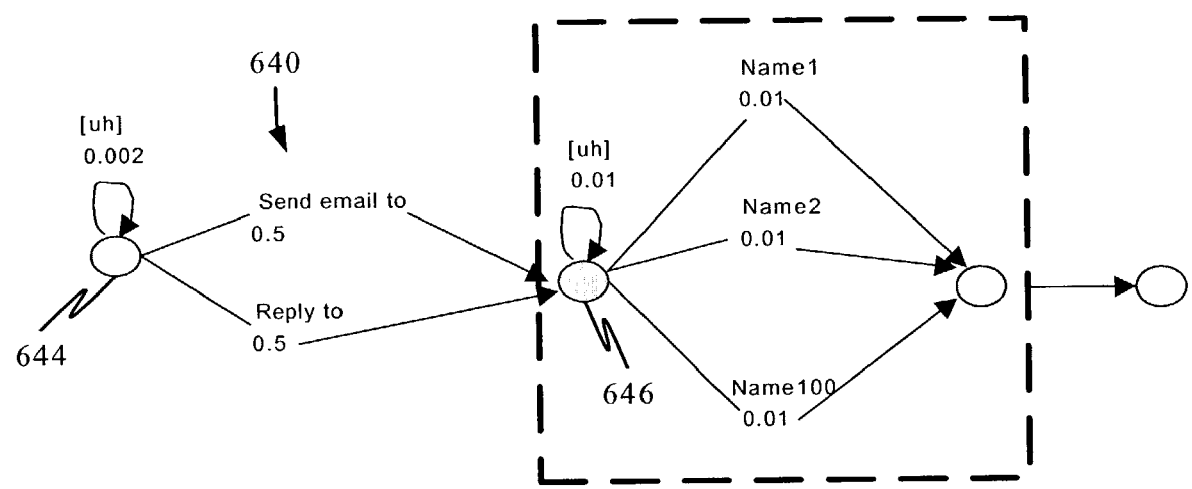
FIG. 5 is a second embodiment illustrating positions of filled pauses in context-free grammars.

FIG. 5 illustrates portions of a CFG language model having a first CFG rule 640 representing sending or replying to an e-mail, while a second CFG is indicative of names of the recipient of the e-mail or reply. Nodes 644 and 646 indicate the allowance of filled pause recognition in the CFG to occur at the beginning of each CFG rule, where the associated transition probability is a function of the number of fan-outs of each corresponding CFG start node. Thus, the invention of this embodiment assumes that the speaker will more likely hesitate and pause while deciding who to send email or reply to than deciding if he/she wants to send email or reply to an email. Once again, it should be noted that filled pause recognition does not occur in this embodiment between all words spoken by the speaker, but rather, at positions that are believed more likely. For instance, in this embodiment, filled pause recognition is not performed between the words of the phrase "send e-mail to", but rather at a position where the speaker may likely pause in order to choose between alternatives. By limiting where processing occurs for filled pause recognition, computer resources can be efficiently used where filled pauses are more likely to be uttered.

The insertion of the self loop with filled pauses at the start node of a CFG and the determination of the self loop transition probability are both automatic (and thus transparent to CFG authors). Therefore another aspect of the present invention allows filled pause recognition to be used with existing CFG rules, thereby not requiring the application author to modify existing CFG rules for filled pause recognition. Likewise, when developing a new CFG language model for a new application, the author does not need to contemplate where filled pause recognition should be provided when writing new CFG rules.

Figure 6:
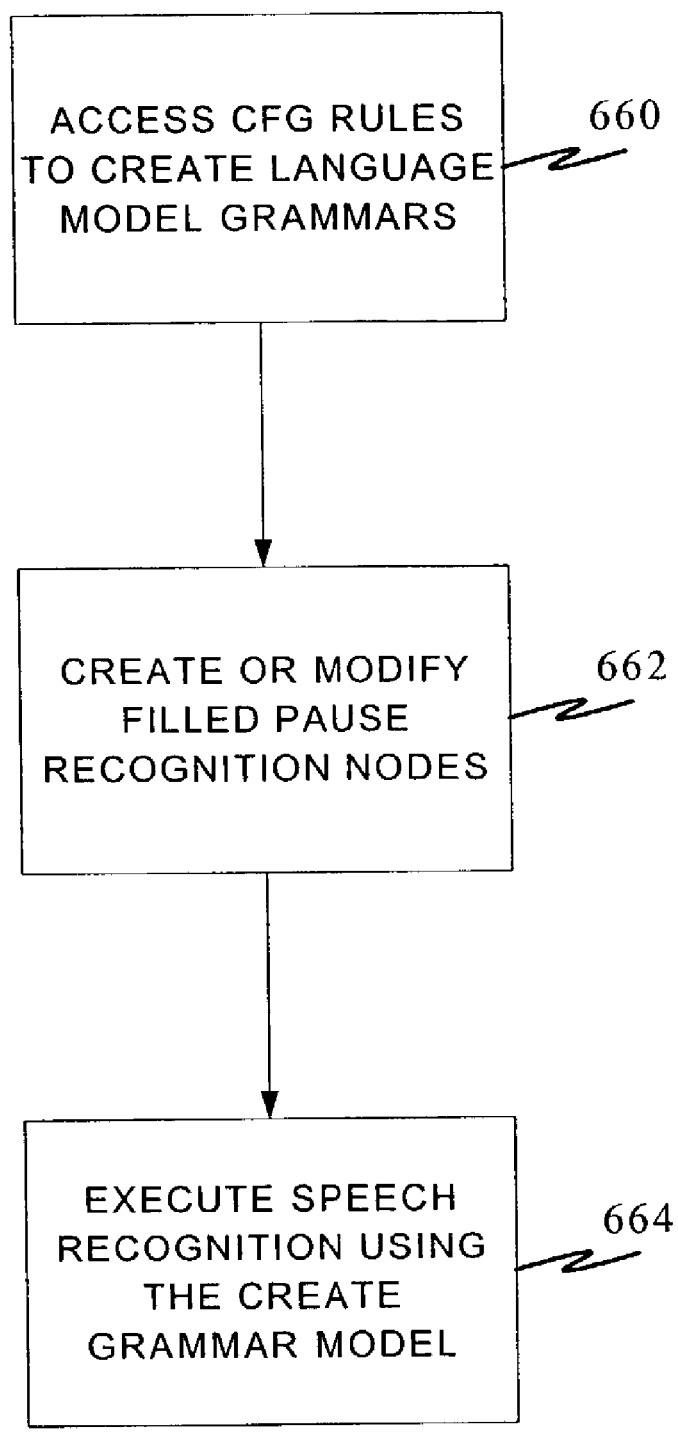
FIG. 6 is a method for incorporating filled pauses in speech recognition processing with a context-free grammar language model.

This aspect of the present invention is illustrated in FIG. 6. At step 660, the CFG rules are accessed in order to create the context-free language model grammars internally for speech recognition.

At step 662, portions of the context-free language model for at least some of the CFG rules are created or modified automatically to include filled pause recognition based on the structure of the CFG rule. In other words, the beginning of each of CFG rule is modified internally in the system for recognition filled pauses. As described above, a transition probability can be calculated based on ascertaining the structure (fan-out) of the corresponding CFG rule and inserted as an optional path when the CFG rule is processed for speech recognition.

With the internal grammar created, speech recognition can be executed at step 664 using the internally modified grammar model.

It should be noted that although described above with respect to a statistical language model and a CFG model, those skilled in the art can appreciate that filled pause recognition can also be implemented using the techniques described above for a hybrid language model that includes N-gram and CFG attributes.

Although the present invention has been described with reference to particular embodiments, workers skilled in the art will recognize that changes may be made in form and detail without departing from the spirit and scope of the invention.

What is claimed is:

1. A computer readable media including instructions readable by a computing device which, when implemented, cause the computing device to handle information by performing steps comprising:
   receiving input speech;
   accessing information indicative of a lexicon including entries transcribed by phones, an acoustic model modeling phones for entries in the lexicon, the acoustic model including at least one ergodic Hidden Markov Model (HMM) model for a filled pause, and a language model modeling word order with filled pauses; and
   processing the input speech using the information to identify filled pauses in the input speech.

2. The computer readable media of claim 1 wherein the language model comprises an N-gram language model, and wherein processing includes processing the input speech where a filled pause is a function of a unigram probability.

3. The computer readable media of claim 1 wherein the language model comprises a context-free grammar, and wherein processing includes processing the input speech allowing identification for filled pauses to occur at a position corresponding to the beginning nodes of the context-free grammar rules being processed.

4. The computer readable media of claim 1 wherein the acoustic model includes an ergodic model for silence, and wherein processing includes processing the input speech to identify silence.

5. The computer readable media of claim 1 wherein the acoustic model includes an ergodic model for noise, and wherein processing includes processing the input speech to identify noise.

6. A computer-implemented method of forming a context-free grammar language model for use in speech recognition, the method comprising:
   accessing a set of context-free grammar rules; and
   creating a context-free grammar language model as a function of the context-free grammar rules, wherein portions of the model for at least some of the rules include allowing identification for filled pauses to occur at a position corresponding to beginning nodes of said at least some the context-free grammar rules.

7. The computer-implemented method of claim 6 wherein creating the context-free grammar language model includes calculating a transition probability to a filled pause for each of the beginning nodes of said at least some the context-free grammar rules.

8. The computer-implemented method of claim 6 wherein calculating the transition probability includes ascertaining a fan-out of the corresponding context-free grammar rule.

9. A speech recognition system, comprising:
   an input receiving a signal indicative of speech;
   a lexicon including entries transcribed by phones;
   an acoustic model modeling phones for entries in the lexicon, the acoustic model including at least one ergodic Hidden Markov Model (HMM) model for a filled pause;
   a language model modeling word order with filled pauses; and
   a decoder coupled to the input, the acoustic model and the language model, recognizing speech including filled pauses represented by the signal.

10. The speech recognition system of claim 9 wherein said at least one HMM ergodic model of the filled pause comprises an HMM ergodic model where every state includes a transition probability to every other state.

11. The speech recognition system of claim 9 wherein the language model comprises a statistically based language model.

12. The speech recognition system of claim 11 wherein the language model comprises an N-gram language model.

13. The speech recognition system of claim 12 wherein the language model comprises a probability for said at least one filled pause as a function of a unigram probability for said at least one filled pause.

14. The speech recognition system of claim 9 wherein the language model comprises a context-free grammar.

15. The speech recognition system of claim 14 wherein the language model includes at least some context-free grammar rules having allowable transitions to a filled pause located at beginning nodes of the context-free grammar rules.

16. The speech recognition system of claim 15 wherein a transition probability to a filled pause is a function of a fan-out of the corresponding context-free grammar rule.

17. The speech recognition system of claim 9 wherein the acoustic model includes an ergodic model for silence.

18. The speech recognition system of claim 9 wherein the acoustic model includes an ergodic model for noise.

19. The speech recognition system of claim 18 wherein the acoustic model for noise is a single model for a plurality of different noises.

20. The speech recognition system of claim 19 wherein the plurality of different noises are selected from a group comprising environmental noise and speaker made noise.

21. The speech recognition system of claim 19 wherein the environmental noise includes microphone noise, keyboard operation, and door open and closings.

22. The speech recognition system of claim 21 wherein the speaker made noise includes breathing noise, laughter and background talking.

\* \* \* \* \*